United States Patent [19]

Olivier

[11] Patent Number: 4,670,515

[45] Date of Patent: Jun. 2, 1987

[54] GRAFTED AND CROSS-LINKED EPM

[75] Inventor: Errol J. Olivier, Baton Rouge, La.

[73] Assignee: Copolymer Rubber & Chemical Corp., Baton Rouge, La.

[21] Appl. No.: 761,672

[22] Filed: Aug. 1, 1985

Related U.S. Application Data

[63] Continuation of Ser. No. 522,987, Aug. 15, 1983, abandoned.

[51] Int. Cl.$^4$ .......................................... C08F 267/04
[52] U.S. Cl. ................................. 525/285; 525/301
[58] Field of Search ............................ 525/285, 301

[56] References Cited

U.S. PATENT DOCUMENTS

| | | | |
|---|---|---|---|
| 3,884,882 | 5/1975 | Caywood | 525/205 |
| 4,026,967 | 5/1977 | Flexman et al. | 525/285 |
| 4,031,062 | 6/1977 | Shirayama et al. | 525/285 |
| 4,161,452 | 7/1979 | Stambaugh et al. | 525/285 |

*Primary Examiner*—John C. Bleutge
*Assistant Examiner*—A. L. Carrillo
*Attorney, Agent, or Firm*—Jones, Day, Reavis & Pogue

[57] ABSTRACT

The peroxide catalyzed reaction of maleic anhydride and a saturated ethylene-propylene rubber of low molecular weight and the hydrolysis thereof produces a reversibly crosslinked product of apparent higher molecular weight by measure of Mooney viscosity but apparent unchanged molecular weight by reduced solution viscosity (RSV). The graft product of a low molecular weight semi-solid substrate can be recovered conveniently as a non-cold flowing solid which has utility as a low molecular weight oil VI improver and as an impact modifier for polar thermoplastic resins.

23 Claims, No Drawings

GRAFTED AND CROSS-LINKED EPM

This application is a continuation Ser. No. 522,987, filed Aug. 15, 1983, now abandoned.

This invention relates to ethylene-mono-olefin copolymer materials having characteristics which enable their use as viscosity improvers in lubricating oils and as agents that are effective to improve impact strength and toughness when blended with various plastic materials, such as polyamides (nylon), polyesters, polycarbonates and the like.

When used as an oil additive to improve viscosity characteristics and to stablize the oil in use, it is desirable to make use of a rubbery ethylene-mono-olefin copolymer of low molecular weight.

When blended with resinous polymers to improve impact resistance and toughness, as well as a number of other physical characteristics, it is also desirable to making use of a rubbery ethylene-mono-olefin copolymer of low molecular weight, as well as a copolymer that will be compatible with the resinous material.

Low molecular weight ethylene-alpha-olefin, and preferably ethylene-propylene, rubbery copolymers can be produced directly for addition to oils as a viscosity index improver or for blending with resinous materials to improve impact strength and toughness. However, by reason of their liquid or viscous consistency, a very significant problem arises in the handling of such low molecular weight materials which require shipment to distant stations for use.

One technique that can be adopted embodies the shipment of the low molecular weight rubbery material in solution in a suitable solvent. This is a commercially impractical technique for the reason that an excessive number of processing steps are involved in taking the copolymer into solution at the point of manufacture, removing the solvent to make the rubbery polymer available at the station of use, the cost that is added by the solvent in the transportation of the solvent solution from the manufacturer to the station of use, and the loss of solvent and polymer that invariably occurs in each of the process steps.

U.S. Pat. No. 4,146,489 describes another technique wherein the problem of handling at the manufacturing site is overcome by the production of solid high molecular weight polymer which can be processed for separation and packaging as a solid material for shipment to the station of use. However, at the station of use, the solid rubbery polymer must be reduced to lower molecular weight as by mechanical or thermal degradation. This again entails a number of additional processing steps including the additional amount of polymerization required to yield a solid high molecular weight, the additional equipment and labor required for mechanical and/or thermal degradation of the polymer at the station of use, and the difficulty of control of the degradation process to provide a broken down, lower molecular weight polymer of uniform characteristics between batches whereby variations occur in the degraded polymers and products produced therewith.

It is an object of this invention to produce and provide a method for producing an adduct in the form of a modified ethylene-propylene or other alpha-olefin copolymer that is compatible for use with oils as an oil additive and compatible with polyamides, polyesters, polycarbonates and other resinous materials for use in increasing the impact strength, toughness and other physical properties, and which uniquely combines the dual physical characteristics of a solid, high molecular weight polymer, as measured by Mooney viscosity, and a low molecular weight, as measured by RSV, whereby the adduct embodies the attributes of a solid high molecular weight polymer in production and packaging and a low molecular weight polymer in use.

The above objective can be achieved, in accordance with the practice of this invention, by grafting maleic anhydride onto an ethylene-propylene copolymer of low molecular weight followed by crosslinking the grafted copolymer by a reaction which is believed to involve hydrogen bonding. Thus, the low molecular weight EPM (ethylene-propylene copolymer) acquires the characteristics of a high molecular weight material which can be easily coagulated for separation from the reaction mixture as a solid and which can be handled as a solid in subsequent packaging, storage, and shipment to a station of use. The crosslinks in the formed solid adduct are easily broken in the presence of the elevated temperatures to which the adduct is exposed in use as a viscosity index improver in lubricating oils or to which it is exposed during blending within polyamides, polyesters, polycarbonates and the like resinous materials, whereby the solid adduct re-acquires substantially the characteriscs of the original low molecular weight polymer. Thus, the adduct handles in production as a solid high molecular weight polymer and functions in use as the desirable low molecular weight polymer.

The invention finds best use in the conversion of ethylene-propylene or other mono-olefin copolymers having a molecular weight within the range of 0.7–2.5 RSV, which are generally of a liquid or viscous liquid consistency, and exhibit cold flow, that would gum up the processing equipment if attempts were made to achieve separation, yet is of the desired viscosity for use as an oil additive or for blending with resinous materials to improve strength. The described objectives can be developed with EPM rubbers having a viscosity as low as 0.4 RSV and for all practical purposes no advantage is derived from the practice of the invention with an EPM rubber having an RSV greater than 2.5, since such latter materials are sufficiently solid in themselves to avoid the described processing and packaging problems.

Another important factor in the practice of this invention resides in the requirement to avoid unsaturated carbon to carbon linkages in the EPM base polymer since such polymerizable unsaturated groupings are many times more active than the groupings on the EPM relied upon for crosslinking whereby the presence of any substantial amounts of such unsaturated groups in the EPM polymer will result in the formation of permanent crosslinks, with the result that the crosslink polymer would be incapable of conversion from the solid high molecular weight phase to a low molecular weight polymer. On the other hand, the crosslinks formed in the practice of this invention, in the substantial absence of unsaturated carbon to carbon groupings in the base polymers, are labile crosslinks which are easily eliminated on exposure to elevated temperature for conversion to the desired low molecular material in use. This phenomenon will be more clearly established by the examples embodied in this application.

As previously pointed out, the invention is addressed to low molecular weight EPM polymers, i.e., copolymers that are formed of ethylene and one or more mono-olefins, preferably propylene, but which may include 1-butene, 1-pentene and other mono-olefins having from 3 up to about 12 carbon atoms. The formed rubbery copolymer may contain therein molar ratios of ethylene to propylene or other mono-olefins varying between 95-10 moles of ethylene to 5-90 moles of propylene or other mono-olefin and preferably 40-66 moles ethylene to 60-34 moles propylene or other mono-olefins.

The interpolymerization reaction is carried out in the presence of a catalyst in a solvent medium. The polymerization solvent may be any suitable inert organic solvent that is liquid under reaction conditions and it may be a prior art solvent for solution polymerization of mono-olefin in the presence of a Ziegler type catalyst. Examples of satisfactory hydrocarbon solvents include straight chain paraffins having from 5-8 carbon atoms, with best results often being secured by the use of hexane; aromatic hydrocarbons and preferably an aromatic hydrocarbon having a single benzene nucleus, such as benzene, toluene and the like; and saturated cyclic hydrocarbons having boiling point ranges approximating those of the straight chain paraffin hydrocarbons and aromatic hydrocarbons described above, and preferably saturated cyclic hydrocarbons having 5-6 carbon atoms in the ring nucleus. The solvent selected may be a mixture of one or more of the foregoing hydrocarbons and preferably a mixture of aliphatic and naphthenic hydrocarbons having approximately the same boiling range as normal hexane. It is desirable that the solvent be dry and free of substances that will interfere with the Ziegler type catalyst used in the polymerization reaction.

Ziegler catalysts of the type well known to the prior art may be used. Such Ziegler type catalysts are disclosed in a large number of patents, such as U.S. Pat. Nos. 2,933,480, 3,093,620, 3,093,621, 3,211,709 and 3,113,115. Examples of Ziegler catalysts include metal organic coordination catalysts prepared by contacting a compound of a heavy metal of the group IV-a, V-a, VI-a and VII-a of the Mendeleeff periodic system of elements, such as titanium, vanadium and chromium halides with an organo-metallic compound of a metal of groups I, II or II of the Mendeleeff periodic system which contains at least one carbon-metal bond, such as trialkyl aluminum, and allyl aluminum halides in which the alkyl groups contain from 1-20 and preferably 1-4 carbon atoms.

The preferred Ziegler catalyst for interpolymerization to produce EPM polymers is prepared from a vanadium compound and an alkyl aluminum halide. Examples of suitable vanadium compounds include vanadium trichloride, vanadium tetrachloride, vanadium oxychloride, vanadium acetyl acetonate, etc. Activators which are especially preferred include alkyl aluminum chlorides of U.S. Pat. No. 3,113,115, general formula $R_1AlCl_2$ and $R_2AlCl$ and the corresponding sesquichlorides of the general formula $R_3Al_2Cl_3$ in which R is methyl, ethyl, propyl, butyl or isobutyl. In the catalyst system, the aluminum to vanadium mole ratio of the aluminum and vanadium compounds may be within the range of 5/1 to 200/1 and preferably within the range of 15/1 to 60/1, with best results being secured in the ratio of 40 aluminum to 1 vanadium. These same ratios apply with respect to corresponding compounds of others of the heavy metals substituted for the vanadium compound and the organo-metallic compounds of groups I, II or III for the aluminum compounds. A catalyst prepared from alkyl aluminum sesquichloride, such as the methyl or ethyl aluminum sesquichloride and vanadium oxychloride is preferred in the ratio of 1 mole vanadium oxychloride per 5-300 moles of aluminum and more preferably 15-60 moles of aluminum, with 40 moles of aluminum per mole of vanadium yielding the best results.

The polymerization is preferably carried out on a continuous basis in a reaction vessel closed to the outside atmosphere, which is provided with an agitator, cooling means and conduit means for continuously supplying the ingredients of the reaction including monomer, catalyst and accelerators and conduit means for continuously withdrawing solution containing elastomer. The polymerization is carried out in a liquid phase in the organic solvent in the presence of a Ziegler catalyst. The solution of elastomer in the polymerization solvent is withdrawn continuously from the reaction vessel, the catalyst is killed by the addition of a catalyst deactivator. When expressed on the basis of RSV, withdrawal is carried out to provide a low molecular weight polymer having an RSV within the range of 0.4-2.5 and preferably 0.7-2.0 measured as a 0.1 percent solution in decalin at 135° C.

The preparation of EPM polymers is well known and is fully described in such patents as U.S. Pat. Nos. 2,933,480; 3,093,621; 3,211,709; 3,646,168; 3,790,519; 3,884,993; 3,894,999; 4,059,654, amongst many others.

Instead of maleic anhydride, use can be made of other unsaturated dicarboxylic acid anhydrides having the general formula

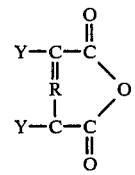

in which R is an alkyl group having from 0-4 carbon atoms and Y is preferably hydrogen but may be an organic group such as a branched or straight chain alkyl group, an anhydride, ketone, heterocyclic or other organic group of 1-12 carbon atoms, a halogen group such as chlorine, bromine, or iodine and the like or the maleic anhydride may be substituted in whole or in part with the corresponding dicarboxylic acids of the aforementioned anhydrides having the general formula

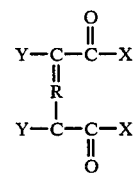

in which R and Y are as defined above and in which at least one, and preferably both of the X groups are hydroxyl but in which one of the X groups may be an ester forming group such as an alkoxy or aryloxy group having from 1-8 carbon atoms. It is preferred to make use of an anhydride as the component grafted onto the EPM polymer since the diacid does not rely on hydrolysis for hydrogen bonding and thus crosslinking proceeds at an excessive rate which results in a higher viscosity by comparison with grafting with the corresponding anhydride.

The desired results are achieved when the amount of anhydride or diacid grafted onto the EPM polymer is within the range of 0.2 to 5% by weight of the base polymer and preferably in an amount within the range of 0.5–4% graft. In general, the amount grafted onto the polymer will represent only 30–50% of the graft material reacted with the polymer. For example, to achieve a graft of 4% maleic anhydride onto an EPM polymer, a charge of about 10% maleic anhydride will be required.

In general, the water that is made available in the system is sufficient to provide for the progressive hydrolysis of the grafted EPM polymer whereby hydrogen bounding can take place to produce the desired adduct as a product. However, the reversible crosslinking reaction of the grafted polymer can be accelerated and more easily controlled to achieve desired levels of molecular weight increase by the addition of water to the grafted copolymer, as will hereinafter be described.

Having described the basic concepts of this invention, illustration will now be made by way of the following examples of the practice of this invention.

EXAMPLE 1

Preparation of a 1.18 RSV, 55 mole percent ethylene-45 mole percent propylene EPM (base rubber)

Into a one gallon continuous stirred tank reactor operating at a temperature of 35° C. and a pressure of approximately 45 psia are fed hexane, ethylene, and propylene at rates of 59 cc/min., 1285 cc/min., and 3283 cc/min., respectively. Simultaneously there are fed an ethylaluminum sesquichloride and vanadium oxytrichloride catalyst mixture having an Al/V molar ratio of 20/1, ethyl perchlorocrotonate promoter, and a Lewis base.

The catalyst mixture is added on demand to maintain the operating pressure. The molar ratio of promoter to vanadium is one. The concentration of the Lewis base is one millimole/l. Under these conditions, a 1.18 RSV (as measured on a 0.1% solution in decalin at 135° C.), 55 mole percent ethylene EPM rubber is produced at a rate of 169 g/hr. The polymerization mixture is allowed to overflow into a water washpot where the catalyst is deactivated and largely removed from the cement. The cement and water are separated in a decanting operation. The polymer may be recovered by precipitation using a non-solvent, steam coagulation, or evaporation of the hexane. Alternatively, the polymer may be retained in solution for further use, such as solution grafting in accordance with the preferred practice of this invention.

EXAMPLE 2

Preparation of a 1.92 RSV, 55 mole percent ethylene-45 mole percent propylene EPM (base rubber)

Into a one gallon continuous stirred tank reactor operating at a temperature of 45° C. and a pressure of approximately 45 psia are fed hexane, ethylene, and propylene at rates of 60 cc/min., 1260 cc/min., and 2909 cc/min., respectively. Simultaneously are fed an ethylaluminum sesquichloride and vanadium oxytrichloride catalyst mixture having an Al/V molar ratio of 20/1, ethyl perchlorocrotonate promoter, and a Lewis base.

The catalyst mixture is added on demand to maintain the operating pressure. The molar ratio of promoter to vanadium is one. The concentration of the Lewis base is one millimole/l. Under these conditions a 1.92 RSV, 55 mole percent ethylene EPM rubber is produced at a rate of 169 g/hr. The polymerization mixture is allowed to overflow into a water washpot where the catalyst is deactivated and largely removed from the cement. The mixture is then led to a decanter where the water phase is separated from the solvent phase containing about 5% by weight of polymer in hexane.

In accordance with the practice of this invention, the manufacture of EPM preferred polymers is interrupted at the cement stage and the grafting reactions are carried out on the polymer while in solution in the solvent in which the monomers are polymerized. This enables the grafting reaction to be performed on polymers having a molecular weight measuring as low as 0.4 RSV without the need to subject a preformed polymer to degradation for reduction of molecular weight for subsequent use. This enables operation of a continuous process wherein the polymer solution can enter into the grafting vessel without the need for recovery of the polymer prior to the grafting reaction.

While it is preferred to carry out the grafting reaction while the polymer is in the cement stage during manufacture of the polymer, as described in the Jeffries U.S. Pat. No. 4,340,689, thereby to avoid the need to continue the reaction to a solid rubber for separation and subsequent breakdown to a low molecular weight polymer for reaction, as described in the aforementioned U.S. Pat. No. 4,146,489, it will be understood that the concepts of this invention can be practiced on a low molecular weight EPM which has been reduced from a solid state by thermal or mechanical degradation.

The following examples illustrate peroxide induced solution grafting of maleic anhydride onto an EPM backbone copolymer in accordance with the practice of this invention.

EXAMPLE 3

The starting polymer is an amorphous ethylene-propylene rubber of Example 1 having about 55 mole percent ethylene, 1.18 RSV as measured on a 0.1% solution in decalin at 135° C., and a Mooney viscosity of ML (1+4) 3 at 257° F. The melt flow index of the starting rubber was found to be 16.2 g/10 minutes under Condition L as described in ASTM method D1238.

A 25.5 weight percent solution of starting rubber (43.6 kg) in dry hexane was heated to 154° C. in a sealed, agitated 80-gallon stainless steel reactor. Maleic anhydride (2,180 g) in 11.4 liters toluene was pressured into the reactor. After allowing for mixing of the monomer, 654 grams dicumyl peroxide (Hercules Dl-Cup T) in 1.9 liters hexane was pressured into the reactor. The temperature and pressure were held at 152°–161° C. and 84–124 psig, respectively, for 60 minutes. After cooling of the mixture, the product was steam coagulated and dried at 65°–80° C. before use. Titrimetric analysis of a purified sample indicated 1.74 weight percent bound maleic anhydride. The properties of the product are reported in Table I.

EXAMPLE 4

The starting polymer is an amorphous ethylene-propylene rubber of Example 2 having about 55 mole percent ethylene, 1.92 RSV as measured on a 0.1% solution in decalin at 135° C., and a Mooney viscosity of ML (1+4) 20 at 257° F. The melt flow index of the starting rubber was found to be 2.5 g/10 minutes under Condition L of ASTM D1238.

A 17.1 weight percent solution of the starting rubber (29.1 kg) in dry hexane was heated to 156° C. in a sealed, agitated 80-gallon stainless steel reactor. Maleic anhydride (1998 g) in 11.4 liters toluene was pressured into the reactor. After allowing for mixing of the monomer, 436 g dicumyl peroxide (Hercules Di-Cup T) in 1.9 liters hexane was pressured into the reactor. The temperature and pressure were held at 156°–158° C. and 126–138 psig, respectively, for 60 minutes. After cooling of the mixture, the product was steam coagulated and dried at 65°–80° C. before use. Titrimetric analysis of a purified sample indicated 1.88 weight percent bound maleic anhydride. The properties of the product are reported in Table I.

It will be apparent to those familiar with the art that the dicumyl peroxide catalyst in Examples 3 and 4 can be replaced in whole or in part with other peroxide catalysts such as t-butyl peroxide, benzoylperoxide, t-butylperoctoate, di-t-butylperoxide, t-butylhydroperoxide, cumene hydroperoxide, t-butyl perbenzoate, or other free radical source capable of hydrogen abstraction, as represented by alkyl peroxy exters, alkyl peroxides, alkyl hydroperoxides, diacyl peroxide and the like. Amount of catalyst as well as reaction conditions will vary with the choice of catalyst.

EXAMPLES 3a, and 4a

The maleic anhydride in Examples 3 and 4 is substituted by equal molecular equivalents of other unsaturated dicarboxylic anhydrides and acids such as itaconic anhydride, fumaric anhydride, maleic acid, fumaric acid and itaconic acid in equal molecular equivalents of maleic anhydride.

EXAMPLE 5

The starting polymer is an amorphous ethylene-propylene rubber having about 55 mole percent ethylene, 2.84 RSV as measured on a 0.1% solution in decalin at 135° C., and a Mooney viscosity of ML (1+4) 67 at 257°F. The melt flow of the starting rubber was found to be 0.3 g/10 minutes under Condition L of ASTM D1238.

A 14.75 weight percent solution of the starting rubber (168.6 g) in dry hexane was heated to 155° C. in a sealed, agitated one-gallon stainless steel reactor. Maleic anhydride (8.43 g) in 20 g acetone was pressured into the reactor. After allowing for mixing of the monomer, 2.53 g dicumyl peroxide (Hercules Di-Cup T) in 23.7 g hexane was pressured into the reactor. The temperature and pressure were held at 155° C. and 150 psig, respectively, for 55 minutes. After cooling of the mixture, the product was recovered by steam coagulation and oven dried at 90°–100° C. before use. Titrimetric analysis of a purified sample indicated 1.18 weight percent bound maleic anhydride. The physical properties of the product are listed in Table I.

TABLE I

Effect of Grafted Maleic Anhydride on Molecular Weight Properties Such as RSV, Mooney Viscosity, And Melt Flow Index

| Example | % MAH Bound | ML 1 + 4 at 257° F. | RSV | Melt Flow Index (Cond. L) (g/10 min.) |
|---------|-------------|---------------------|------|---------------------------------------|
| 3 | 0 | 3 | 1.18 | 16.2 |
| 3 | 1.74 | 62 | 1.15 | 3.3 |
| 4 | 0 | 20 | 1.92 | 2.5 |
| 4 | 1.88 | 98 | 1.70 | 1.8 |
| 5 | 0 | 67 | 2.84 | 0.3 |
| 5 | 1.18 | 128 | 2.52 | 0.2 |

Examples 3, 4 and 5 and the tabulation in Table I show the effect of bound maleic anhydride (MAH) on polymer properties associated with molecular weight. Mooney viscosity and melt flow index reflect a marked increase in the molecular weight on grafting and crosslinking that occurs with the water present, whereas RSV indicates little change in molecular weight. The RSV measure is taken of a 0.1% solution in decalin at 135° C., which is sufficient to cause breakdown of the labile crosslinks for return of the polymers to their actual molecular weights with grafted MAH. Polymers of Examples 1 and 2 are originally liquid or semiliquid polymers which exhibit cold flow at room temperature.

EXAMPLE 6

This example demonstrates the effect of the additions of the different increments of water on the crosslinking by hydrogen bounding of a maleic anhydride grafted EPM, as illustrated by changes in viscosities.

A maleic polymer having an RSV=0.98, containing 1.62% bound maleic anhydride was dissolved in hexane to a 4% by weight solution. In separate experiments various amounts of water were added to portions of the 4% solution. The mixtures were shaken mechanically overnight. Results of subsequent viscosity measurements are shown in Table II.

TABLE II

| Expt. | $H_2O$ Added (%)* | Cement Viscosity at Room Temperature (cps) |
|-------|-------------------|---------------------------------------------|
| A | 0 | 534 |
| B | 3.75 | 744 |
| C | 7.50 | 1,024 |
| D | 15.0 | 4,880 |
| E | 30.0 | 6,420 |
| I | 45.0 | 35,200 |
| F | 60.0 | 60,000 |
| H | 75.0 | 102,000 |
| G | 90.0 | 108,000 |
| J | 120.0 | 171,000 |

*Mol % $H_2O$ based upon 4% MAH in polymer

It will be seen from Example 6 that cement viscosity increases with the increased water content.

Crosslinking of the grafted polymer is believed to occur through hydrogen bounding or by polar interactions between the carboxylic groups of the grafted diacid or anhydride. The desired crosslinking reaction does not occur when both of the hydroxyl groups are occupied by an ester forming group, and it occurs more slowly when only and in lesser amounts where only one of the hydroxyl groups of the diacid is available to form the labile crosslinks for increase in molecular weight. This is illustrated by the following tabulation.

TABLE III

| Graft Monomer (5 wt. %) | Degree of Graft (wt. %) | Cement Viscosity @ 20% Solids (cps) Room Temperature | ML(1 + 4) @ 125° C. |
|-------------------------|--------------------------|-------------------------------------------------------|----------------------|
| Dimethyl Maleate | 0.6 | 4,360 | 18 |
| Maleic anhydride | 0.6 | 15,000 | 40 |
| Maleic Acid | 0.7 | 130,000 | 76 |
| None | — | 8,000 | 20 |

It will be seen that no crosslinking is evidenced by grafting with dimethyl maleate, whereas molecular weight build-up from crosslinking is clearly obtained both with the diacid and the anhydride.

While present utility of the low molecular weight adduct as an oil viscosity index (VI) improver and in blends with polyamides, polycarbonates, polyesters and the like resins, makes use of heat whereby the crosslinks are disrupted to provide the low molecular weight polymer, other materials and methods can be employed for disrupting the crosslinks. This is illustrated by the conversion of the insoluble or gelled crosslink polymer to a soluble state upon treatment. In the following example, the grafted and crosslinked EPM is subjected to various materials for their solvation effect.

EXAMPLE 7

This example is to illustrate the solvolysis of hydrogen bound crosslinked gel by the polar solvents.

The maleic anhydride grafted polymer of Example 6 was dissolved in hexane to an 8% solution. The bulk viscosity of the 8% solution was 1,125 cps at 23° C. To the 8% polymer in hexane solution, 2% by weight of $H_2O$ based on the cement weight was added and shaken overnight at room temperature. The hexane solution became a hard gel after overnight shaking. To the hard gel, 4% v/v of various polar solvents were added and shaken. The hard gel readily dissolved to low viscosity solutions. The results are shown as follows:

| Cements | Cement Viscosity at Room Temperature |
|---|---|
| (a) 8% maleic polymer | 1,125 |
| (b) 2%* $H_2O$ to (a) | hard gel |
| (c) Methanol** to (b) | 48 |
| (d) Isopropanol to (b) | 56 |
| (e) Acetone to (b) | 320 |
| (f) Methyl ethyl ketone to (b) | 60 |
| (g) Methyl-t-butyl-ether to (b) | 440 |
| (h) Butyl acetate to (b) | 360 |
| (i) Tetrahydrofuran to (b) | 456 |
| (j) Chloroform to (b) | 27,100 |

*2% $H_2O$ is based on total cement weight.
**All of the polar solvents added are 5% by volume of cement.

EXAMPLE 8

As previously pointed out, the peroxide catalyzed reaction of maleic anhydride with unsaturated polyolefins, such as EPDM, proceeds generally with the formation of permanent crosslinks. This crosslinking is exhibited as gel which, above certain practical limits, interferes with subsequent processing of the product. For example, the ability of a polyolefin to be reshaped repeatedly under the proper conditions of temperature and pressure is reduced as the gel content increases. Also the handling of polymer cements becomes increasingly difficult because of the higher solution viscosities associated with higher levels of gel. The product is extensively crosslinked and, after removal of solvent, cannot be molded. Reaction under identical conditions, except for the exclusion of maleic anhydride, produces no gel. This demonstrates that maleic anhydride is responsible for the crosslinking in the reaction with unsaturated polyolefins. This is illustrated by the following example where the grafting is sought to be carried out on an EPDM in the form of an amorphous ethylene-propylene-diene rubber having 63.7 mole percent ethylene, 34.3 mole percent propylene and 2.0 mole percent 5-ethylidene-2-norbornene.

A solution of the rubber in dry hexane was charged to a 12-oz. polymerization bottle and purged thoroughly with dry nitrogen. The bottle was fitted with a cap and rubber septum, and subsequent additions were made via syringe. The weight of the cement was found to be 170 grams, and was 7.9 weight percent solids. Maleic anhydride (1 part per hundred parts rubber) was added in 5 ml acetone. Commercial t-butylperoxypivalate (Lupersol 11, 1.14 parts per hundred parts rubber) was added, and the mixture was heated at 85° C. for 30 minutes with shaking. Simultaneously, an identical mixture, except that it lacked maleic anhydride, was reacted. After the 30 minutes, the mixture containing the maleic anhydride was gelled, while that lacking it was not. The products were recovered by coagulation in methanol using a Waring blender, followed by oven drying. The percent of a 200 mg sample which would not dissolve in 100 ml toluene after shaking four hours at room temperature is reported as percent gel. The product of the reaction mixture containing maleic anhydride was found to have 82% gel. The product of the reaction mixture lacking maleic anhydride was found to have no gel. This is illustrated in the table below.

| Effects of MAH and Peroxide on EPDM | | | |
|---|---|---|---|
| Mole % Ethylidene Norbornene | Peroxide Charged, phr | MAH Charged, phr | % Gel (Toluene) |
| 2 | 0 | — | nil |
| 2 | 1.14 | — | nil |
| 2 | 1.14 | 1 | 82.3 |

In contrast to the behavior exhibited in reaction with EPDM, maleic anhydride may be reacted via peroxide catalysis with saturated ethylene-propylene polymers, in particular low molecular weight ethylene-propylene polymers, in accordance with the practice of this invention, to produce a modified EPM which does not exhibit a substantial amount of gel formation.

The following examples demonstrate the effects of the polymer molecular weight and maleic anhydride content on cement solution viscosity.

EXAMPLE 9

The starting polymer is an amorphous ethylene-propylene rubber having about 55 mole percent ethylene, 1.18 RSV as measured on a 0.1% solution in decalin at 135° C., and a Mooney viscosity of ML (1+4) 3 at 257° F.

A 20.0 weight percent solution of the starting polymer (300 g) in dry hexane was heated to 158° C. in a sealed, agitated one-gallon stainless steel reactor. Maleic anhydride (12.0 g) in 68 g toluene was pressured into the reactor. After allowing for mixing of the monomer, 4.5 g dicumyl peroxide (Hercules Di-Cup T) in 13.5 g hexane was pressured into the reactor. The temperature and pressure were held at 156°–158° C. and 140–158 psig, respectively, for 60 minutes. After cooling of the mixture, the product was recovered by steam coagulation and oven dried at 90°–100° before use. Titrimetric analysis of a purified sample indicated 1.17 weight percent bound maleic anhydride. Physical properties of the product are reported in Table IV.

EXAMPLE 10

The starting polymer is an amorphous ethylene-propylene rubber having about 55 mole percent ethylene, 1.95 RSV as measured on a 0.1% solution in decalin at 135° C., and a Mooney viscosity of ML (1+4) 25 at 257° F.

To a 20.0 weight percent solution of the starting polymer (332.6 g) in dry hexane was added 0.34 g Irganox 1076 antioxidant (Ciba-Geigy). The solution was heated to 153° C. in a sealed, agitated one-gallon stainless steel reactor. Maleic anhydride (9.98 g) in 40 g toluene was pressured into the reactor. After allowing for mixing of the monomer, 4.99 g dicumyl peroxide (Hercules Di-Cup T) in 22 g hexane was pressured into the reactor. The temperature and pressure were held at 153°–155° C. and 126–160 psig, respectively, for 60 minutes. After cooling of the mixture the product was recovered by steam coagulation and oven dried at 90°–100° C. before use. Titrimetric analysis of a purified sample indicated 0.9 weight percent bound maleic anhydride. Physical properties of the product are reported in Table IIIA.

In a second reaction a 20.0 weight percent solution of the starting rubber (308.5 g) in dry hexane was heated to 155° C. in a sealed, agitated one-gallon stainless steel reactor. Maleic anhydride (15.43 g) in 15.6 acetone was pressured into the reactor. After allowing for mixing of the monomer, 4.63 g dicumyl peroxide (Hercules Di-Cup T) in 23.1 g hexane was pressured into into the reactor. The temperature and pressure were held at 155°–157° C. and 170 psig, respectively, for 50 minutes. After cooling of the reaction mixture, the product was recovered by steam coagulation and oven dried at 90°–100° C. before use. Titrimetric analysis of a purified sample indicated 1.37 weight percent bound maleic anhydride. Physical properties of the product are reported in Table IIIA.

For Examples 9 and 10, the Brookfield viscosities were measured at room temperature (23° C.). Reaction product cements were measured within 24 hours of the end of the reaction.

The instrument used for measurement is a Brookfield Synchro-Lectric Viscometer, Model RVT.

TABLE IIIA

Effect of MAH Graft on Cement Viscosity

| Example | % MAH Bound | RSV | ML 1 + 4 at 257° F. | Wt. % Solids | Cement viscosity at room temperature (CPC) |
|---|---|---|---|---|---|
| 9 | 0 | 1.18 | 3 | 19.1 | 1,160 |
| 9 | 1.17 | 1.18 | 34 | 19.1 | 2,430 |
| 10 | 0 | 1.95 | 25 | 20.0 | 11,400 |
| 10 | 0.90 | 1.98 | 50 | 20.4 | 17,200 |
| 10 | 1.37 | 1.94 | 95 | 20.0 | 23,320 |

It will be seen that the lower the molecular weight of the rubber polymer the lower cement viscosities both before and after grafting. Thus, higher throughputs can be achieved with lower RSV rubbers. Such higher solids is desirable from the standpoint of the relationship between solids levels and graft efficiency.

The level of solids EPM in the cement has a linear affect on the degree of graft. Within the range of 15–25 percent solids, a 1 percent change in solids has about a 0.05 percent change in the degree of graft, in which the degree of graft increases with increased solids.

The degree of graft is also influenced somewhat by the peroxide level. For example, within the range of 1–2 phr peroxide catalyst (Di-Cup), a 0.1 phr increase in catalyst will yield about a 0.5% increase in degree of graft. The degree of graft is defined as the weight of bound maleic anhydride divided by the combined weight of rubber plus bound maleic anhydride, expressed as a percent.

Illustration will now be made of the demonstrated utility of the adducts of this invention to increase the impact strength and toughness of polyamides.

EXAMPLES 11, 12, 13 AND 14

Comparison is made between Examples 11 and 13, the rubbers of which differ in molecular weight but have about the same degrees of graft. A second comparison is made between Examples 12 and 14, the rubbers of which differ in molecular weight but have about the same degrees of graft. The control, having no added rubber, exhibits very low impact strength in comparison with all of the rubber blends.

Blends were prepared by passing mixtures of rubber and predried nylon resin through a single screw extruder with screw dimensions of 1"×23", a barrel temperature of 425°–450° F., exit temperature of 375°–400° F., extrusion rates of 10–20 grams per minute. Fifty percent blends were prepared first, and these were diluted with nylon to the 15/85 rubber/nylon blends. Injection molded samples were stored in moisture proof polyethylene bags for 16–24 hours before testing.

TABLE IV

Properties of MAH Grafted Rubbers of Different Molecular Weights and Their Blends with Nylon 6

| | Example | | | | Control |
|---|---|---|---|---|---|
| | 11 | 12 | 13 | 14 | |
| Source of rubber | Example 3 | Example 9 | Example 4 | Example 5 | |
| % Bound MAH | 1.74 | 1.17 | 1.88 | 1.18 | — |
| RSV | 1.15 | 1.18 | 1.70 | 2.52 | — |
| MFI (Cond. L, g/10 min.) | 3.27 | 18.4 | 1.83 | 0.21 | — |
| ML 1 + 4 at 257° F. | 62 | 34 | 98 | 128 | — |
| Blend Properties | | | | | |
| % Rubber | 15 | 15 | 15 | 15 | 0 |
| Izod Impact Strength (ft.-lbs./inch of notch) (⅛" sample) | 18.4 | 16.6 | 14.2 | 13 | 1.0 |
| Tensile Strength (psi) | 5824 | 6030 | 6400 | 7280 | 10600 |
| MFI (Cond. R, g/10 min.) | 10.6 | 13.3 | 11.2 | 12.1 | 24.8 |

It will be seen from the results that the impact strength of the nylon resin was materially increased by the incorporation of the adducts in relatively small amounts.

It is believed that the lower molecular weight rubbers are more easily blended with the nylon because rubber viscosity decreases with molecular weight. This means that better dispersion and, therefore, smaller particles are obtained when lower molecular weight rubbers are used with the result of higher impact strength.

The following demonstrates the utility of the grafted-crosslinked EPM rubbers in oil as a viscosity index improver.

EXAMPLE 15

The rubbers used are the same as those described in Example 3.

EXAMPLE 16

The rubber used is the starting polymer of Example 5.

PREPARATION OF THE OIL SOLUTIONS

Solutions of 8.5% rubber in SNO-5 oil were prepared by dissolving the solid rubber at 150° C. under a nitrogen atmosphere and with low shear stirring. The 8.5% solutions were then diluted to 1.55% with oil.

Kinematic viscosities at 100° C. were measured in Cannon-Fenske viscometers. Measurements were made before and after shearing in a fuel injector shear stability tester.

| | Properties of 1.55% Rubber in Oil Solutions | | | | |
|---|---|---|---|---|---|
| | % Bound | | ML 1 + 4 | TP | |
| Example | MAH | RSV | at 257° F. | (cSt) | % SSI |
| 15 | 0 | 1.18 | 3 | 7.2 | 17.3 |
| 15a | 1.74 | 1.15 | 62 | 9.3 | 24.2 |
| 16 | 0 | 1.84 | 67 | 19.2 | 45.8 |

SSI = shear stability index, a measure of the resistance to shear induced degradation.
TP = thickening power, the increase in solution viscosity effected by addition of the rubber.

Shear stability (SSI) is related to molecular weight (as reflected in RSV). Lower molecular weight (lower RSV) rubbers exhibit lower percent SSI values. Lower percent SSI means better shear stability. The rubbers of Examples 15, 15a, and 16 demonstrate this point. The grafted rubber of Example 15a exhibits oil solution properties much closer to those of the base rubber of Example 15 from which it was made than to those of the ungrafted rubber of Example 16, which is close to the grafted rubber of Example 15a in Mooney viscosity, a solid state property.

It will be apparent from the foregoing that the incorporation of the grafted and crosslinked EPM adduct into the oil or plastic material involves the exposure of the adduct to elevated temperatures sufficient to disrupt crosslinks where the rubbery component functions in use as a low molecular weight component in the final product to enhance impact strength and toughness of the plastic into which it is blended or to optimize its properties as a viscosity improver in oils.

It will be understood that changes may be made in the details of formulation and operation without departing from the spirit of the invention, especially as defined in the following claims.

I claim:

1. A grafted and reversibly crosslinked, ethylene, mono-olefin copolymer having an RSV value within the range of 0.4 to 3.0 and in which the copolymer is a polymer rubber which is free of unsaturated carbon to carbon linkages in the polymer chain, in which the material grafted onto the polymer is an anhydride or derivative thereof having the general formula:

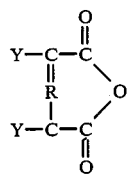

or correspondening dicarboxylic acid or derivative thereof having the general formula:

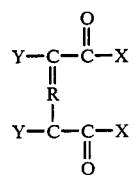

in which R is an alkylene group having from 0 to 4 carbon atoms, Y is selected from the group consisting of hydrogen, halogen or an organic group having from 1-12 carbon atoms and X is a hydroxyl or ester forming group but in which at least one X is hydroxyl, and in which the crosslinks are formed in the presence of water and are easily disruptable in use whereby the grafted and crosslinked polymer comprises a solid high molecular weight material which reverts to a low molecular weight in use.

2. A grafted and reversibly crosslinked polymer as claimed in claim 1, in which the polymer is formed by copolymerization of ethylene and one or more higher mono-olefins.

3. A grafted and reversibly crosslinked polymer as claimed in claim 1, in which the polymer is a copolymer of ethylene and propylene.

4. A grafted and reversibly crosslinked EPM as claimed in claim 3, in which the mono-olefins are present in EPM in the ratio of 95–10 moles of ethylene to 5–90 moles of propylene.

5. A grafted and reversibly crosslinked EPM as claimed in claim 3, in which the mono-olefins are present in EPM in the ratio of 40–66 moles of ethylene to 60–34 moles of propylene.

6. A grafted and reversibly crosslinked EPM are claimed in claim 3, in which the material grafted onto the EPM is maleic anhydride.

7. A grafted and reversibly crosslinked EPM as claimed in claim 3, in which the material grafted onto the EPM is maleic acid or mono ester thereof.

8. A grafted and reversibly crosslinked EPM as claimed in claim 3, in which the amount of graft is within the range of 0.5 to 4%.

9. A grafted and reversibly crosslinked EPM as claimed in claim 3, in which the amount of graft is within the range of 0.2 to 5%.

10. A grafted and reversibly crosslinked EPM as claimed in claim 3, in which the EPM is a liquid or semi-liquid or coldflowing EPM having an RSV within the range of 0.7 to 2.5.

11. A grafted and reversibly crosslinked EPM as claimed in claim 3, in which the crosslinks are disruptable when heated to a temperature above 125° in use.

12. A grafted and reversibly crosslinked EPM as claimed in claim 3, in which the crosslinks are disruptable when treated with an alcohol.

13. The method for producing a grafted and reversibly crosslinked polymer as claimed in claim 1, which comprises the steps of grafting onto a low molecular weight polymer free of unsaturated groups in the polymer chain, an anhydride or derivative thereof having the general formula:

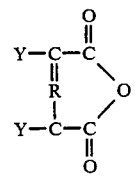

or its corresponding dicarboxylic acid or derivative thereof having the general formula:

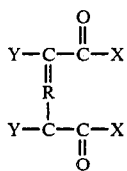

in which R is an alkylene group having from 0 to 4 carbon atoms, Y is selected from the group consisting of hydrogen, halogen or an organic group and X is a hydroxyl or ester forming group in which at last one X is hydroxyl, and crosslinking the grafted polymer in the presence of water whereby crosslinks that are formed are of the labile type to provide a solid high molecular weight grafted and crosslinked polymer but in which the crosslinks are easily disrupted in use to provide a low molecular weight grafted polymer.

14. The method as claimed in claim 13, in which the polymer is a polymer formed by copolymerization of ethylene and one or more higher mono-olefins.

15. The method as claimed in claim 13, in which the polymer is a copolymer of ethylene and propylene.

16. The method as claimed in claim 13, in which the polymer is an EPM copolymer of ethylene and propylene present in the EPM in the ratio of 95-10 moles of ethylene to 5-90 moles of propylene.

17. The method as claimed in claim 15, in which the mono-olefins are present in the EPM in the ratio of 40-66 moles of ethylene to 60-34 moles of propylene.

18. The method as claimed in claim 15, in which the material grafted onto the EPM is maleic anhydride.

19. The method as claimed in claim 15, in which the material grafted onto the EPM is maleic acid or a mono ester thereof.

20. The method as claimed in claim 15, in which the amount of graft is within the range of 0.5 to 4%.

21. The method as claimed in claim 15, in which the amount of graft is within the range of 0.2 to 5%.

22. The method as claimed in claim 15, in which the EPM is a liquid or semi-liquid or coldflowing EPM having an RSV within the range of 0.7 to 2.5.

23. The method as claimed in claim 15, in which the crosslinks are disruptable when heated to a temperature above 125° in use.

* * * * *